Patented Nov. 3, 1931

1,829,992

UNITED STATES PATENT OFFICE

ARCHIE R. KEMP, OF WESTWOOD, NEW JERSEY, ASSIGNOR TO BELL TELEPHONE LABORATORIES, INCORPORATED, OF NEW YORK, N. Y., A CORPORATION OF NEW YORK

RUBBER COMPOSITION

No Drawing. Original application filed August 24, 1927, Serial No. 215,235, and in Great Britain December 15, 1927. Divided and this application filed February 27, 1929. Serial No. 343,249.

In the specification of my application for U. S. Letters Patent, Serial No. 215,235, filed August 24, 1927, there are described methods of treating rubber to render it electrically stable under the continued influence of sea water and there is also described the product resulting from the use of such methods.

The present invention relates to compositions of matter including as an essential constituent the rubber product resulting from treatment in accordance with the methods of the above mentioned specification or a similar product produced by equivalent methods.

Insulating materials for under water cables and more especially deep sea cables should possess suitable electrical characteristics, such as low dielectric constant and low dielectric losses stable and permanent under sea bottom conditions; properties rendering them easily extrusile such as a proper degree of thermoplasticity; suitable mechanical properties such as toughness, lack of brittleness, appropriate cold flow characteristics; and permanency under storage and sea bottom conditions; and for commercial utility, reasonable cost.

An object of the invention is to provide compositions of matter having the foregoing properties combined within a single substance.

A further object is to provide compositions of matter, primarily, for deep sea cable insulation, and, secondarily, for other uses, and having properties as good or better for these purposes than gutta percha, which is relatively scarce and expensive.

Another object is to reduce the percentage of gutta percha employed in a submarine cable insulating composition.

A constituent of insulating material or other composition of matter in accordance with the invention is "deproteinized rubber", under which expression will be included rubber in which the proteins have been dispersed or have been broken down and removed or have been otherwise modified to a sufficient extent to render the rubber suitable for the intended purpose without, however, producing any isomeric or polymeric change in a substantial proportion of the rubber hydrocarbon molecules themselves.

A method of producing such a constituent is to immerse crude Hevea rubber in the form of crepe sheets in water in a pressure tank, then subject it to a temperature of 150° C. for 24 hours, wash for one hour in accordance with usual washing technique, and dry the rubber in a vacuum.

An alternative method is to dilute commercial Hevea latex containing ammonia as a preservative with five parts of water for each part of latex, heat the diluted mixture in a pressure tank at a temperature of 150° C. for 13 hours, cool to room temperature, coagulate with acetic acid, remove the coagulum and wash it for one hour at a temperature of 55° C. and then air dry at room temperature.

The chemical, mechanical and electrical properties of products produced in accordance with the two foregoing methods are such as to render the products highly desirable as a constituent of compositions of matter, including other suitable ingredients, suitable for submarine cable insulation.

A second constituent is gutta percha or balata. For the purpose of this specification balata will be considered as a species of gutta percha. The gutta percha or balata may be deresinated before incorporation into the final product.

A third constituent comprises one or more lignite derivatives commonly known as Montan wax or Montan pitch. These lignite derivatives, when in commercial form, may be purified or refined before incorporation into the mixture.

Specification of the three principal constituents enumerated does not exclude from the product a proportion of ordinary rubber or of other waxes, thermoplastics, fillers, or preservatives, although in general such additional constituents are unnecessary and when included will ordinarily be in proportions relatively small as compared with the principal constituents. However, the invention includes compositions in which the second and third principal constituents are not both present as some desirable compositions may include only one of them.

A particular composition, prepared in accordance with the invention, consisted of 33% deproteinized rubber, prepared from crepe sheets, 30% balata, and 37% Montan wax.

Another composition comprised 29% deproteinized rubber, 36% balata, and 35% Montan pitch.

The constituents of these compositions were milled together and thoroughly commingled by methods well known in the art.

Another composition consisted of 29 pounds of deproteinized rubber, which was prepared from the crude Hevea rubber treated for 24 hours at 150° pounds steam pressure, washed one hour and dried in a vacuum, 20 pounds of commercial balata, 16 pounds of deresinated balata, and 35 pounds of Montan pitch. Samples of this composition in the form of sheets 0.05" in thickness were immersed in a 3.5% sodium chloride solution for four weeks at ordinary temperature and pressure, removed and dried in a uniform manner, placed between plane circular electrodes 5" in diameter and tested with an alternating current at a frequency of 1000 cycles per second at a temperature of 25° C. and atmospheric pressure. This test showed that the specimens had a dielectric constant of 2.5 and a phase difference angle of 21 minutes, 29 seconds, which corresponds to a value of the constant $\frac{G}{C}$ of 39.2, where G represents the conductance in micromhos per nautical mile and C represents the capacitance in microfarads per nautical mile.

Another composition containing 40% deproteinized rubber prepared from Hevea rubber sheet, 40% deresinated balata, and 20% Montan wax was similarly found to have a dielectric constant of 2.6 and a phase difference angle of 23 minutes, 37 seconds at ordinary temperature and pressure, which corresponds to a value of $\frac{G}{C}$ of 43.2.

Another composition included 35% Hevea rubber sheet deproteinized in the form of latex, 30% deresinated balata, and 35% Montan wax refined by bleaching the powdered wax with cold benzine until the benzine was no longer highly colored. This compound had a dielectric constant of 2.68 and a phase difference angle of 17 minutes at 25° C. at atmospheric pressure and 1000 cycles per second, the corresponding value of $\frac{G}{C}$ being 31.1.

A cable core insulated with a composition containing equal parts of deproteinized rubber and deresinated balata had a dielectric constant of 2.6 and a phase difference angle of 9 minutes, 1 second, the corresponding value of $\frac{G}{C}$ being 16.5. The specific insulating composition with which this cable core was insulated was first invented by Martell and is disclosed and claimed in his application Serial No. 308,610, filed September 17, 1928.

The data given above relate to measurements taken at room temperature and at atmospheric pressure; the electrical properties of these materials do not change unfavorably when the compositions are subjected to the low temperature and high pressure existing at sea bottom. Thus a cable core insulated with the above mentioned compound containing 35% heat treated rubber, 30% deresinated balata, and 35% refined Montan wax having a length of 220 ft. and an outside diameter of 0.46" had an electrostatic capacity per nautical mile of 0.313 microfarads and a conductance of 17.2 micromhos per nautical mile at 25° C., atmospheric pressure and 900 cycles per second. When the pressure was increased to 5000 pounds per square inch and the temperature lowered to 0° C. the capacity was found to be 0.316 microfarads and the conductance 12.2 micromhos. It is interesting to note that gutta percha insulated cable cores do not change greatly in capacity with such increased pressure and reduced temperature as described, but their conductance increases under those circumstances about three times. Thus, for example, a gutta percha insulated core of the above dimensions may be expected to have a conductance of about 50 micromhos per nautical mile at deep sea pressure and temperature.

Tests on the compositions described and other similar compositions have demonstrated that their physical and chemical properties are satisfactory for submarine cable insulation.

In the following claims the word "rubber" will be used to include various species of rubber and the word "deproteinized" will be used in conjunction therewith without discriminating between deproteinization of the rubber in the form of latex or in a solid form, and to include artificial dispersion.

Deproteinization may be accomplished for the purposes of this invention in accordance with the methods described in my application, Serial No. 215,235, filed August 24, 1927 of which this application is a division and reference is made to that application for further details.

The expression "gutta percha" in the claims will include balata unless otherwise specified but the word "balata" will not include gutta percha.

The use of compositions, such as described herein, is not limited to submarine cable insulation but they may be applied generally wherever compositions of similar characteristics are used.

What is claimed is:

1. A composition of matter suitable for insulating long submarine signaling cables, characterized in this, that the composition is composed chiefly of deproteinized rubber and gutta percha.

2. A composition in accordance with claim 1, characterized in this, that the gutta percha is deresinated before use.

3. A composition of matter in accordance with claim 1, characterized in this, that the composition includes a substantial proportion of Montan lignite derivative.

4. A composition in accordance with claim 1, characterized in this, that the gutta percha includes a proportion of balata.

5. A composition in accordance with claim 1 including a substantial proportion of wax which is hard at room temperatures.

6. A composition of matter including deproteinized rubber, gutta percha and Montan lignite derivative in substantially equal proportions.

7. A composition of matter comprising deproteinized rubber, balata and Montan lignite derivative.

8. A composition of matter comprising as principal constituents deproteinized rubber, deresinated balata and Montan wax.

9. A composition of matter having as constituents between 20 and 50% each of deproteinized rubber, balata and Montan lignite derivative.

10. A thermoplastic composition of matter, including a relatively large proportion of Hevea rubber hydrocarbon, substantially in its natural state of polymerization and having its natural nitrogenous content substantially reduced, and a wax which is hard at ordinary temperature as a plasticizing agent, said composition being tough and non-brittle at ordinary temperatures, capable of being extruded upon a signaling conductor, having cold flow characteristics similar to gutta percha, and which at sea bottom temperature and pressure has a dielectric constant around 3.0 or under and a phase difference angle of 30 minutes or less when tested at a frequency of 1000 cycles.

11. An insulating material suitable for insulating long submarine signaling cables and consisting of rubber hydrocarbon having its natural nitrogen content reduced more than 50% and being intimately combined with gutta percha, and Montan lignite derivative.

12. An insulating material composed largely of rubber treated to have such stabilized electrical properties as are obtained by treating rubber in water for several hours under a steam pressure at a temperature considerably above 100° C., thoroughly washing and drying, said treated rubber being and intimately intermingled with balata.

13. A composition of matter comprising approximately 33% rubber, in which the protein content has been reduced substantially, approximately 30% balata and approximately 37% Montan derivative.

14. A composition of matter comprising approximately 29% rubber having a substantial amount of the protein removed therefrom, approximately 36% balata and approximately 35% Montan pitch.

15. An insulating material especially suitable for deep sea submarine signaling cables comprising essentially largely deproteinized rubber, balata, and a wax which is solid at room temperature, said composition having a lower dielectric constant and a lower value $$of \frac{G}{C}$$

at around room temperature, atmospheric pressure and 1000 cycles than high grade gutta percha cable insulation.

16. A composition of matter in accordance with claim 1, in which the gutta percha constituent consists of balata and is present in an amount substantially equal to the amount of deproteinized rubber.

In witness whereof, I hereunto subscribe my name this 23d day of February, 1929.

ARCHIE R. KEMP.